Patented May 13, 1952

2,596,136

UNITED STATES PATENT OFFICE 2,596,136

THERMOSTIFFENING SHEET MATERIAL AND PROCESS OF MAKING SAME

Wentworth A. Ernst, Hudson, Mass., assignor to Beckwith Manufacturing Company, Dover, N. H., a corporation of New Hampshire No Drawing. Application June 27, 1950, Serial No. 170,687

11 Claims. (Cl. 117—76)

This invention pertains to combining and stiffening plies of thermosetting resin-impregnated sheet material used in fabric and other laminates, particularly in shoe construction where it is desired to combine into a stiff unitary laminar construction the various elements of the upper. Specifically this invention comprises a ply of fibrous or fabric material impregnated with a thermosetting resin with which is distributed in intimate or surface association a normally substantially inert material having strong catalytic properties with respect to the condensation or polymerization reaction of the resin, at elevated temperatures.

Heretofore it has not been considered practical to add to thermosetting resins the strong catalysts necessary to promote their rapid cure long prior to their ultimate use. The presence of such catalysts, even at room temperature, causes sufficient condensation or polymerization of the resin to necessitate its ultimate use shortly after the catalyst is added. Milder catalysts can, of course, be present in thermosetting resins for longer periods of time, but they have been found ineffectual to promote the thermosetting reaction at economical rates and temperatures. In the shoemaking art thermosetting box toe stiffeners, generally consisting of a fabric or felt impregnated with a water-soluble thermosetting resin, as, for instance, the water soluble initial condensate of phenol-formaldehyde, are prepared for use by dipping the blanks into an aqueous solution of catalyst just prior to assembling them between the shoe lining and the doubler, preparatory to lasting.

The principal object of this invention is to provide a resin-impregnated ply for use in combining and stiffening laminated structures having a practically unlimited useful storage life in which is preliminarily incorporated any desired catalytic material. Thus, by means of this invention, it is practical for a manufacturer of thermosetting box toe or counter stiffeners to incorporate catalysts in the resin prior to their sale to shoe manufacturers. A desirable economy is introduced into the shoemaking process through the elimination of the previously necessary step of applying catalyst to the stiffener prior to its assembly. Another desirable feature of this invention is that the combining and stiffening ply is dry when assembled with the surrounding plies, since the necessity of applying aqueous solution of catalyst has been obviated. This makes it more easily handled and positioned, and less messy for the operator.

Because of the hygroscopic character of many water soluble thermosetting condensation resins, plies of fabric impregnated with these resins often develop tacky surfaces under humid atmospheric conditions. This characteristic has resulted in storage difficulties, for, when the plies are stacked in storage, the tendency toward blocking can be extremely serious. One embodiment within the scope of this invention has the further object of eliminating this tendency toward blocking.

I have discovered that these and other desirable results can be achieved by incorporating the catalyst in an inert medium adapted to isolate the catalyst from the resin under normal storage conditions, and release it during or just preliminary to the curing operation. This invention is based on the discovery that the catalyst can be temporarily isolated from the resin by incorporating it in an inert amorphous solid material which is compatible with the resin and which has a melting point lower than the curing temperature of the resin. This catalyst mixture has no tendency to promote condensation or polymerization of the resin at temperatures below the melting point of the incorporating medium. Consequently it may be combined with the resin without accelerating the thermosetting reaction and without impairing its storage life. Under curing conditions when the resin is heated, the incorporating medium liquefies and migrates into the resin, thereby releasing the catalyst and making it functionally available.

The resins suitable for use in this invention are generally those having an initial condensation stage which is capable of undergoing further condensation or polymerization through the action of heat and a catalyst. Preferably the resins in their initial stage are solid and water soluble in order that aqueous solutions of them may be prepared with which fabric or fibrous material may be impregnated. For example such resins may be employed singly or in combination as the initial condensation products or resole of phenol-formaldehyde, urea formaldehyde or urea furfural. These resins are referred to hereafter as water soluble thermosetting resins, and the phrase is intended to include all resins having these descriptive properties without being limited to the specific examples given. By the term "water soluble" is meant not only the ability to form true solutions, but also the ability to form colloidal solutions or dispersions.

Catalytic materials within the concept of this invention include those substances whose presence with the resin promote the condensation or polymerization of the initial condensate or resole to form the final infusible and insoluble solid mass characteristic of such resins. Satisfactory catalysts include, but are not limited to benzoic acid, phthalic anhydride, benzoyl peroxide maleic acid and diammonium phosphate.

In accordance with this invention the catalyst is first incorporated in an inert amorphous solid material which is preferably compatible with the resin and which has a melting point lower than the temperature required to promote the final condensation or polymerization of the resin. Such inert materials include amorphous waxes and fatty acids, but their ultimate selection will depend chiefly on the nature and curing temperature of the particular resin. It will also be seen that the inert material must not be soluble in water. Various techniques are available for combining the catalyst with the inert medium, and for combining the catalyst-mixture with the resin. The inert medium may be conveniently first melted and the catalyst either dissolved or suspended in it, depending on the mutual solubilities of the ingredients. The catalyst mixture can then be comminuted by spraying and cooling and the resulting comminuted catalyst mixture added to a solution of the resin prior to the impregnation of the fabric or fibrous ply material. Alternatively the ply material can first be impregnated with the resin and the comminuted catalyst mixture sprinkled on either or both surfaces. It is also feasible and convenient to spray the molten catalyst mixture directly on the surfaces of the resin impregnated ply, since the mixture is cooled and solidified before appreciable thermosetting reaction is initiated.

It would be expected that the curing of the resin would be most effective when catalyst is distributed more or less evenly throughout the mass of resin. It has been found, however, that a thorough cure will often result although the catalyst mixture has been applied only to the surfaces of the impregnated ply. In shoes having a thermosetting box toe stiffener of resin-impregnated flannel, the surfaces of which have been sprayed or dusted with the catalyst mixture, the toe portions, assembled and treated according to ordinary shoemaking practice, are exceptionally stiff and strong. Apparently the curing operation causes the catalyst mixture and the uncured resin to melt, and the combining pressures resulting from the lasting operation causes these materials to flow and mix. When the toe is cured it consists of a hard and strong lamination of doubler, stiffener and lining. Application of the catalyst mixture to the surfaces of the ply is not only more convenient, but is especially desirable in that it also provides a surface coating that prevents the development of tacky surfaces, and eliminates any tendency of the plies to block during storage.

Variations of a preferred embodiment of this invention, selected for purposes of illustration and with special reference to its application to thermosetting box toes, are described below. The water soluble thermosetting resin is one that has given good results, and is representative of such resins. Accordingly this invention is not limited to this particular resin but includes all resins embraced within the descriptive phrase, water soluble thermosetting resins, as described above. The particular catalysts and inert fusible materials have accordingly been selected for illustrative purposes with regard to the particular resin chosen, the examples of catalysts being those adapted to cure this resin and the inert fusible material being examples of those compatible with the resin and having melting points lower than its curing temperature.

Example I

A solution of resin is prepared by mixing together
40 parts by weight of water soluble phenol-formaldehyde initial condensation product.
45 parts by weight of water soluble urea-formaldehyde initial condensation product.
15 parts by weight of natural latex containing 60% solids.
88 parts by weight of water.

A suitable phenol-formaldehyde resin is Carbatex 305. Carbatex 838 is a suitable urea-formaldehyde resin. Both of these are sold in powdered form by Carbatex Chemical Co., Tewksbury, Massachusetts. The resin mixture of Example I when dried cures at a temperature between 220° F. and 250° F.

Catalysts adapted to promote the curing of this resin include diammonium phosphate and benzoic acid. Examples of inert fusible materials compatible with this resin and having melting points below its curing temperature are Opal wax #10, with a melting point between 177.8 and 184.1° F., and stearic acid, with a melting point of 157.1° F.

Example II

Diammonium phosphate is not soluble in either of these inert materials and must, therefore, be pulverized and incorporated as a suspension. One part by weight of diammonium phosphate pulverized to pass through a 150 mesh screen is added at three parts by weight of molten Opal wax #10 and stirred in.

Example III

Benzoic acid can be dissolved in the inert material. Mix together 10 parts by weight of benzoic acid, 15 parts by weight of Opal wax #10, and 10 parts by weight of stearic acid and heat and stir to give a molten homogeneous mixture.

The combining and stiffening ply material of this invetnion is produced by impregnating a sheet of fabric or fibrous material with the resin solution. The catalyst mixture can be added to the solution of resin prior to the impregnation of the ply or applied to the surfaces of the impregnated ply. For thermosetting box toes a suitable fabric is double napped flannel of weight 4.2 oz./sq. yd.

Example IV

Conveniently the flannel is dipped into the resin solution of Example I, passed through squeeze rollers to remove excess solution, and adjusted as to their spacial relationship to give a dried ply containing about 70% by weight of resin, and dried in a stream of hot air. The molten catalyst-mixture of Example II or Example III is then sprayed on the surfaces of the dried ply. The ply is thin enough and lasting pressures great enough to cause adequate mixing of catalyst and resin during curing. This ply is anti-blocking.

Alternatively the catalyst mixtures can be reduced to a comminuted solid material by spraying the molten mixture into the air, and thereby cooling and solidifying the sprayed particles. An ordinary paint sprayer having an integral heating element is well adapted for this purpose. When the catalyst mixture comprises a suspension of water soluble particles in the inert material, such as that described in Example II, it is desirable to wash the comminuted particles with water to remove exposed particles of catalyst. Instead of spraying the surfaces of the resin-impregnated ply with molten catalyst mixture, as suggested in Example IV, these surfaces can be dusted or sprinkled with the comminuted catalyst mixture.

In many applications of this invention it will not be sufficient to apply the catalyst mixture to the surface of the resin impregnated ply. The ply may be too thick or the lamination pressures too low to cause proper mixing of catalyst and resin. For such applications it becomes necessary to incorporate the catalyst mixture more or less evenly throughout the mass of resin.

*Example V*

Comminuted catalyst mixture resulting from the spray cooling of the molten mixtures described in Example II or Example III is added to and mixed with the resin solution of Example I, the amount added being about 0.4% of the weight of the resin solution. This mixture of resin solution containing a suspension of particles of catalyst mixture is used to impregnate the fabric as fibrous ply, as described in Example IV. Care must be taken during the drying of the ply to keep its temperature below the melting point of the catalyst mixture, so as not to release the catalyst into the resin prematurely.

Laminates incorporating the combining and stiffening ply of this invention are made according to conventional practice. The combining and stiffening ply is placed between surrounding plies of sheet material, or combined alternatively with plies of sheet material, and the combination is heated under pressure.

Box toe stiffeners used in shoe construction can be made by dyeing out blanks of the resin impregnated sheet material, and skiving the edges according to the usual practice. These blanks are used in the ordinary manner, with the exception that they need not be soaked in a solution of catalyst preliminary to lasting. Residual moisture in the resin keeps them sufficiently soft to conform to the contours of the last. The toe portion of the lasted shoe, usually consisting of the outer leather, doubler, stiffener and lining is heated in the manner customarily employed with thermosetting box toe stiffeners to form a strong and stiff box toe. Strength is imparted through the lamination of the doubler, stiffener and lining, as well as through the increased rigidity of the resin caused by its condensation or polymerization.

Having thus disclosed my invention and described in detail a specific manner of its application for purposes of illustration, but not by way of limitation, I claim as new and desire to secure by Letters Patent:

1. A thermostiffening sheet material comprising in combination a fibrous sheet material, a water-soluble normally solid thermosetting resin and a mixture comprising a catalyst adapted to promote the thermosetting action of said resin incorporated in a resin-compatible water-insoluble inert solid amorphous material having a melting point lower than the curing temperature of said resin.

2. A thermostiffening sheet material comprising a ply of fibrous sheet material impregnated with a water-soluble normally solid thermosetting resin and surface coated with a mixture comprising a catalyst adapted to promote the thermosetting action of said resin incorporated in a resin-compatible water-insoluble inert solid amorphous material having a melting point lower than the curing temperature of said resin.

3. A thermostiffening sheet material comprising a ply of fibrous sheet material impregnated with a water-soluble normally solid thermosetting resin and containing dispersed throughout the resin comminuted particles of a mixture comprising a catalyst adapted to promote the thermosetting action of said resin incorporated in a resin-compatible water-insoluble inert solid amorphous material having a melting point lower than the curing temperature of said resin.

4. A shoe stiffener material comprising fabric impregnated with a water-soluble normally solid thermosetting resin, and surface coated with a mixture comprising a catalyst incorporated in a resin-compatible wax having a melting point lower than the curing temperature of the resin.

5. A shoe stiffener material comprising flannel impregnated with a resin selected from the group consisting of the initial condensation product of phenol-formaldehyde and the initial condensation product of urea furfural, and surface coated with a mixture comprising a catalyst for the resin incorporated in Opal wax.

6. A shoe stiffener material comprising a fabric impregnated with a resin selected from the group consisting of the initial condensation product of phenol-formaldehyde and the initial condensation product of urea furfural and containing dispersed throughout the mass of resin comminuted particles comprising a mixture of a catalyst incorporated in Opal wax.

7. A shoe stiffener comprising a fabric impregnated with a mixture comprising the initial condensate of phenol-formaldehyde and the initial condensate of urea furfural and surface coated with a mixture comprising Opal wax in which is incorporated a catalyst selected from the group consisting of diammonium phosphate, benzoic acid, phthalic anhydride, benzoyl peroxide, and maleic acid.

8. A shoe stiffener comprising a fabric impregnated with a mixture comprising the inital condensation product of phenol-formaldehyde and the initial condensation product of urea furfural and containing dispersed throughout the mass of resin comminuted particles comprising a mixture of Opal wax in which is incorporated a catalyst selected from the group consisting of diammonium phosphate, benzoic acid, phthalic anhydride, benzoyl peroxide, and maleic acid.

9. The process of making shoe stiffening material which includes the steps of saturating a textile fabric with an aqueous solution of thermosetting resin, drying the saturated fabric, and then coating its surface with a catalyst for the resin incorporated in a wax which is compatible with the resin when the resin is polymerized and having a melting point below the curing temperature of the resin.

10. The process of making shoe stiffening material which includes the steps of adding to an aqueous solution of thermosetting resin comminuted particles of a mixture comprising a catalyst for the resin incorporated in a wax which is compatible with the resin when the resin is polymerized and has a melting point lower than the curing temperature of the resin, impregnating a textile fabric with this mixture of resin and catalyst wax mixture, and drying the impregnated fabric at a temperature lower than the melting point of the wax.

11. In the process of making sheet material impregnated with a water-soluble normally solid thermosetting resin, the step of adding to the resin a mixture comprising a catalyst adapted to promote the thermosetting action of said resin incorporated in a resin-compatible water-insoluble inert solid amorphous material having a melting point lower than the curing temperature of said resin.

WENTWORTH A. ERNST.

REFERENCES CITED

The following references are of record in the file of this patent:

UNITED STATES PATENTS

| Number | Name | Date |
|---|---|---|
| 2,433,680 | Backman | May 19, 1944 |

FOREIGN PATENTS

| Number | Country | Date |
|---|---|---|
| 583,471 | Great Britain | Dec. 19, 1946 |